(12) United States Patent
Petsinger et al.

(10) Patent No.: US 7,139,936 B2
(45) Date of Patent: Nov. 21, 2006

(54) METHOD AND APPARATUS FOR VERIFYING THE CORRECTNESS OF A PROCESSOR BEHAVIORAL MODEL

(75) Inventors: Jeremy Petsinger, Fort Collins, CO (US); Kevin David Safford, Fort Collins, CO (US); Karl P. Brummel, Fort Collins, CO (US); Russell C. Brockmann, Fort Collins, CO (US); Bruce A. Long, Loveland, CO (US); Patrick Knebel, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 591 days.

(21) Appl. No.: 10/645,567

(22) Filed: Aug. 22, 2003

(65) Prior Publication Data

US 2004/0039966 A1    Feb. 26, 2004

Related U.S. Application Data

(63) Continuation of application No. 09/502,366, filed on Feb. 18, 2000, now Pat. No. 6,625,759.

(51) Int. Cl.
*G06F 11/00*    (2006.01)

(52) U.S. Cl. ............................. 714/28; 714/34; 703/14
(58) Field of Classification Search .................. 714/28, 714/30, 32, 34; 703/14
See application file for complete search history.

(56) References Cited

U.S. PATENT DOCUMENTS

| | | | | |
|---|---|---|---|---|
| 5,438,673 A | * | 8/1995 | Court et al. | 703/22 |
| 5,475,852 A | * | 12/1995 | Yoshida et al. | 714/34 |
| 5,845,064 A | * | 12/1998 | Huggins | 714/33 |
| 5,859,962 A | * | 1/1999 | Tipon et al. | 714/33 |
| 5,859,999 A | | 1/1999 | Morris et al. | |
| 5,860,017 A | | 1/1999 | Sharangpani et al. | |
| 6,285,914 B1 | * | 9/2001 | Bae et al. | 700/121 |
| 6,332,201 B1 | * | 12/2001 | Chin et al. | 714/28 |
| 6,643,800 B1 | * | 11/2003 | Safford et al. | 714/35 |

OTHER PUBLICATIONS

Wolfe, A., "Patent shed light on Merced's Innards", Electronic Engineering Times, Feb. 15, 1999.

* cited by examiner

*Primary Examiner*—Robert Beausoliel
*Assistant Examiner*—Marc Duncan

(57) ABSTRACT

An apparatus verifies the correctness of a behavioral model of a microcode machine, where the microcode machine is operable in a native state and an emulated state. The apparatus includes means for producing the native state, means for producing the emulated state, and means for comparing the native state and the emulated state. Corresponding to the apparatus, a method verifies the correctness of a processor behavioral model, where the processor operates in a native mode state and an emulated mode state. The method includes determining if a macroinstruction to be executed is a native instruction, and, if the macroinstruction is a native instruction, executing the native instruction, the execution producing the native mode state of the processor. The method further includes, if the macroinstruction is not a native instruction, fetching the macroinstruction, providing microinstructions corresponding to the macroinstruction, and executing the microinstructions, the execution producing the native mode state of the processor. Finally, the method includes executing the macroinstruction, the execution producing an emulated state of the processor, and comparing the native mode state the of the processor with the emulated state of the processor.

18 Claims, 3 Drawing Sheets

METHOD AND APPARATUS FOR VERIFYING THE CORRECTNESS OF A PROCESSOR BEHAVIORAL MODEL

RELATED APPLICATIONS

This application is a continuation application of application Ser. No. 09/502,366, filed Feb. 18, 2000 now U.S. Pat. No. 6,625,759, which is hereby incorporated by reference in its entirety.

TECHNICAL FIELD

The technical field is computer modeling that tests microprocessor or chip design and function.

BACKGROUND

Current computer architectural testing often involves comparing the results of instructions executed on a reference model and instructions executed on a behavioral model. A microcode based machine is one in which a user visible instruction (macroinstruction) is broken down into a sequence of microinstructions that emulate the behavior of the macroinstruction, and are not directly visible to the user. On a microcode based machine, such testing is completed without microinstruction modeling or checking. Because current systems do not include modeling on the microinstruction level, current systems are only capable of checking the behavioral model on the macroinstruction boundaries in the emulated instruction set, or on transitions between the microinstruction set and native mode instruction set. In addition, current systems have not been able to verify the correctness of the microinstruction sequence and control (aliasing) information. Furthermore, current microcode simulators can only execute microinstructions without faults or traps, or other dynamic information. These simulators were designed for performance analysis rather than checking correctness.

SUMMARY

What is disclosed is an apparatus for verifying correctness of a behavioral model of a microcode machine, where the microcode machine is operable in a native state and an emulated state. The apparatus includes means for producing the native state, means for producing the emulated state, and means for comparing the native state and the emulated state.

Also disclosed is a method for verifying the correctness of a processor behavioral model, where the processor operates in a native mode state and an emulated mode state. The method includes determining if a macroinstruction to be executed is a native instruction, and, if the macroinstruction is a native instruction, executing the native instruction, the execution producing the native mode state of the processor. The method further includes, if the macroinstruction is not a native instruction, fetching the macroinstruction, providing microinstructions corresponding to the macroinstruction, and executing the microinstructions, the execution producing the native mode state of the processor. Finally, the method includes executing the macroinstruction, the execution producing an emulated state of the processor, and comparing the native mode state the of the processor with the emulated state of the processor.

Further, what is disclosed is a method for verifying the correctness of a behavioral model of a micro-coded machine. The method includes the steps of executing a sequence of microinstructions on a native mode simulator, the execution producing a native mode state of the microcoded machine, where the sequence of microinstructions corresponds to a macroinstruction, executing the macroinstruction on an emulated mode reference simulator, the execution producing an emulated state of the micro-coded machine, and checking the native mode state and the emulated state against the behavioral model.

Still further, what is disclosed is an apparatus that verifies the correctness of a processor behavioral model. The apparatus includes a microcode storage that stores microcode corresponding to microinstructions, a microcode expander that reads the microcode storage, a native mode reference simulator that executes microinstructions, to produce a native mode sate of a processor, an emulated mode reference simulator that executes macroinstructions, where a macroinstruction includes a sequence of microinstructions, to produce an emulated mode state of the processor, and a state checker that compares the native mode state and the emulated mode state to the behavioral model.

DESCRIPTION OF THE DRAWINGS

The detailed description will refer to the following drawings, in which like numerals refer to like objects, and in which.

DETAILED DESCRIPTION

A new electronic device design usually includes testing to verify that the device functions as intended. This is particularly true for electronic devices comprising digital logic circuitry. Because the number of digital logic variables can be large and because each variable can exist in a number of states, the possible combinations and permutations of conditions for a digital logic circuit can be large. This is especially true for complex digital logic circuits, such as processors (including, for example, general purpose microprocessors, mathematical processors or coprocessors, digital signal processors, or other special purpose processors, controllers, microcontrollers, or microprocessors), which, accordingly, present challenges for testing and verification.

Figure 1:
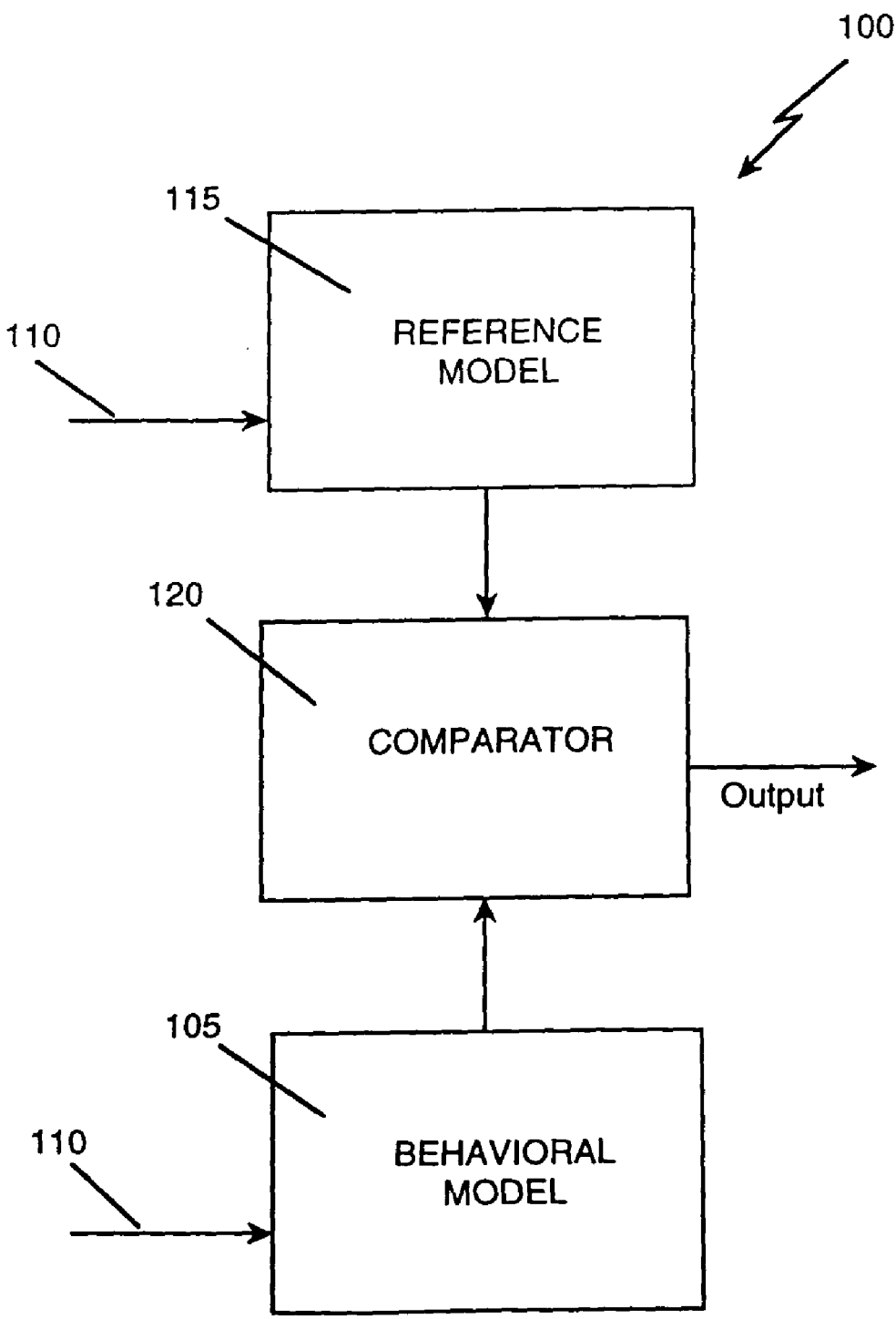
FIG. 1 is a block diagram of a general model for testing a digital logic device.

An arrangement 100 for testing a design of a digital logic device (e.g., a processor) is illustrated in FIG. 1. Rather than testing the actual hardware device, the arrangement 100 may test the design of the digital logic device using software models and emulations. A device model 105 is an accurate and detailed model of the actual hardware device. The device model (behavioral model) 105 may be expressed in a hardware description language (HDL), such as VHDL or Verilog, for example, both of which are known in the art. Test vectors 110 are applied to the device model 105. For testing a CPU, the test vectors 110 are code sequences such as programs, or portions of programs intended to run on the CPU. The test vectors 110 may include internal digital variable values that place the device model 105 into a known initialized state. The test vectors 110 are also applied to a device emulator (reference model) 115, which is a simplified functional model of the hardware embodiment of the digital logic device. The reference model 115 may be a software program written in C language, for example. The reference model 115 differs from the device model 105 in that the device model 105 is a close approximation to the actual hardware embodiment of the digital logic device, whereas the reference model 115 represents only the functionality of the digital logic device, as ideally envisioned by the device designer. The reference model 115 executes both macroinstructions and native mode instructions.

With a predetermined initial condition set by the test vectors 110, both the device model 105 and the reference model 115 are simulated in operation. A comparator 120 receives outputs of the device model 105 and the reference model 115, noting any differences. If differences are present, then the device model 105 has not performed as intended, and the design of the digital logic device may be modified.

Figure 2:
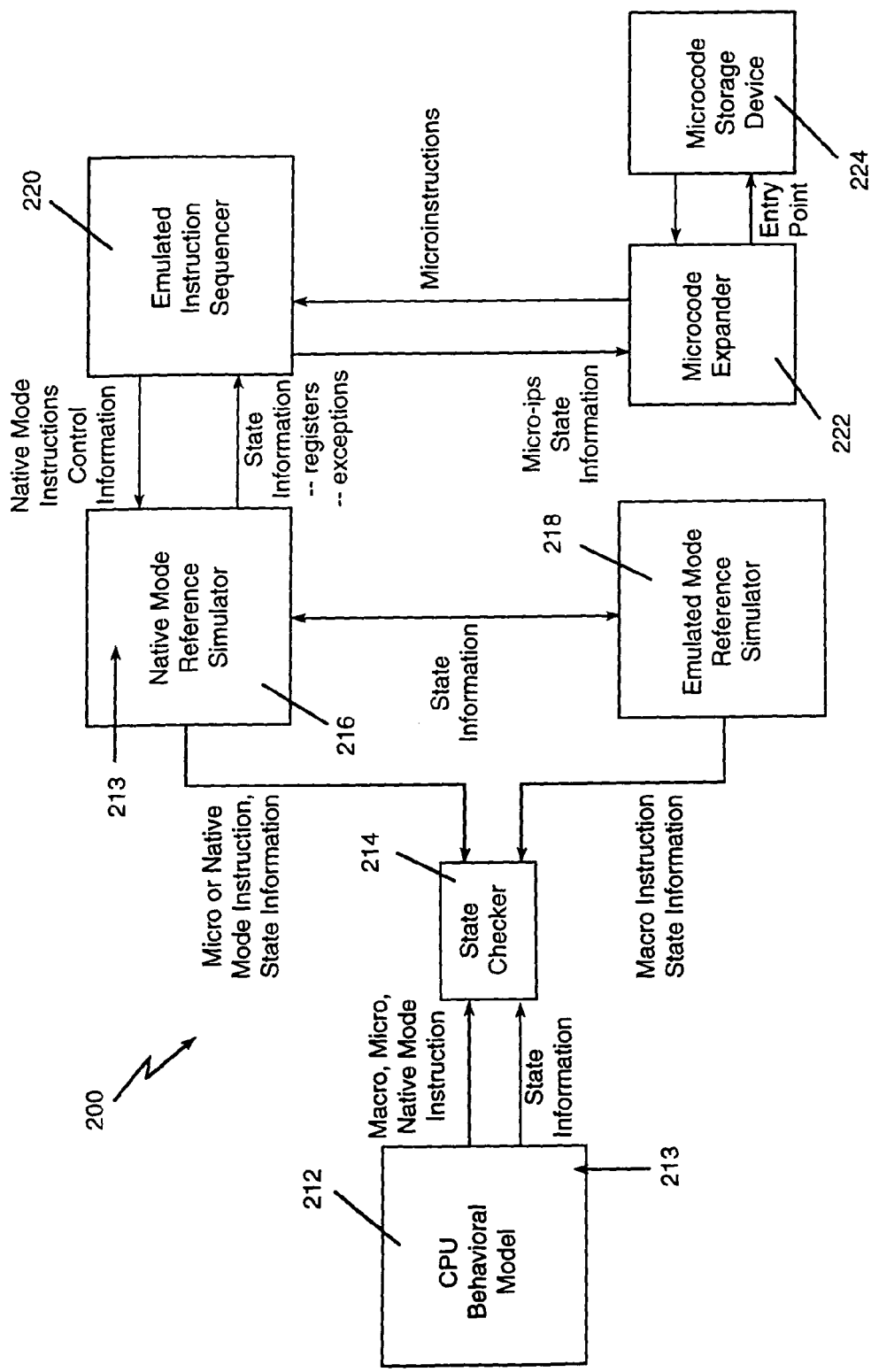
FIG. 2 is a block diagram showing an embodiment of components used to verify the correctness of a processor behavioral model.

FIG. 2 is a more detailed block diagram of a mechanism 200 that may be used to verify correct operation of a CPU behavioral model 212 at the microinstruction level. The behavioral model 212 may be a chip, the physical (hardware) implementation of a CPU, or hardware description language HDL, for example. Other components of the mechanism 200 include a state checker 214, a native mode reference simulator 216, an emulated mode reference simulator 218, an emulated instruction sequencer 220, a microcode expander 222, and a microcode storage device 224.

The mechanism 200 supports two modes of architectural checking while executing instructions in the emulated instruction set. A first mode compares an emulated instruction set architectural state between the CPU behavioral model 212 and the reference model at macroinstruction boundaries (i.e., at the completion of a macroinstruction). A second mode compares an entire native mode architectural state at microinstruction boundaries.

The CPU behavioral model 212 provides event information and state information. The event information includes macroinstructions and microinstructions in emulated instruction set mode, and native mode instructions in native instruction set mode. The state checker 214 compares outputs from the native mode reference simulator 216 and the emulated mode reference simulator 218 with state information from the CPU behavioral model 212. The native mode reference simulator 216 executes a sequence of instructions and provides state information. For example, the native mode reference simulator 216 executes a sequence of microinstructions, and provides state information after the execution of each microinstruction of the sequence. The emulated mode reference simulator 218 checks the results of each emulated macroinstruction. That is, the emulated mode reference simulator 218 compares the result of each macroinstruction against the CPU behavioral model 212. Both the CPU behavioral model 212 and the native mode reference simulator 216 receive input test vectors 213 so that both the behavioral and reference models are given the same initial conditions.

The emulated instruction sequencer 220, microcode expander 222 and microcode storage device 224 convert macroinstructions into a sequence of microinstructions based on dynamic execution information. The emulated instruction sequencer 220 may be implemented as a high-level abstraction of an emulated instruction sequencer in the emulated instruction set hardware of the CPU behavioral model 212. Given state information from the execution of a microinstruction, the emulated instruction sequencer 220 determines the next operation in the sequence of microinstructions that must be executed to complete the macroinstruction. For example, the emulated instruction sequencer 220 may determine that the next operation is to take an exception, handle a microjump, end the macroinstruction, or continue to the next microinstruction. As a further example, if a microinstruction is a floating point instruction, and a numeric exception is generated, the CPU may generate an exception when the CPU attempts to execute the floating point instruction. Thus, which particular microinstruction the emulated instruction sequencer designates cannot be statically predicted since state information may affect the choice of microinstructions to execute next. As yet another example, microinstructions can generate native mode faults and may invoke a special microcode handler. The microcode handler sets a native mode instruction set and transitions to the native mode instructions set. Similarly, a microinstruction can invoke a microcode assist in response to a specific microinstruction result (e.g., a masked floating point exception). Both of these last two events may cause the emulated instruction sequencer 220 to produce a different sequence of microinstructions, based on dynamic information.

Microinstructions include the native instruction to be executed as well as a variety of control information. The microcode expander 222, which is operably coupled to the emulated instruction sequencer 220, is used to generate the microinstructions. The microcode expander 222 directly reads a model of the microcode storage device 224, which contains the encodings of the microinstructions. Based on macroinstruction information, alias fields within the microinstruction are filled in to create an instruction that can be executed on the native mode reference simulator 216.

The native mode reference simulator 216 takes inputs from the emulated instruction sequencer 220 and then provides the results of the microinstruction execution. The native mode reference simulator 216 maintains architectural state information for both the native and emulated instruction sets. The native mode reference simulator 216 is capable of executing both microinstructions and normal native instructions.

The emulated mode reference simulator 218 executes the emulated instruction on macroinstruction completion. The emulated mode reference simulator 218 compares the result against the sequence of microinstructions generated by the mechanisms 216, 220, 222 and 224.

The mechanisms 216, 220, 222 and 224 enhance the designer's ability to develop microcode by modeling dynamic events and directly generating microcode entry points into the microcode storage device 224. This provides a one-to-one correspondence between the reference model and the CPU behavioral model 212. Additionally, using the emulated mode reference simulator 218 to verify a sequence of microinstructions correctly emulates the macroinstructions allows microcode to be developed and tested in a standalone environment that is independent of the CPU behavioral model 212.

Finally, the mechanism 200 allows the designer to observe breakpoints after microinstructions. This allows the designer to observe the native mode architectural state during execution of an emulated instruction.

Figure 3:
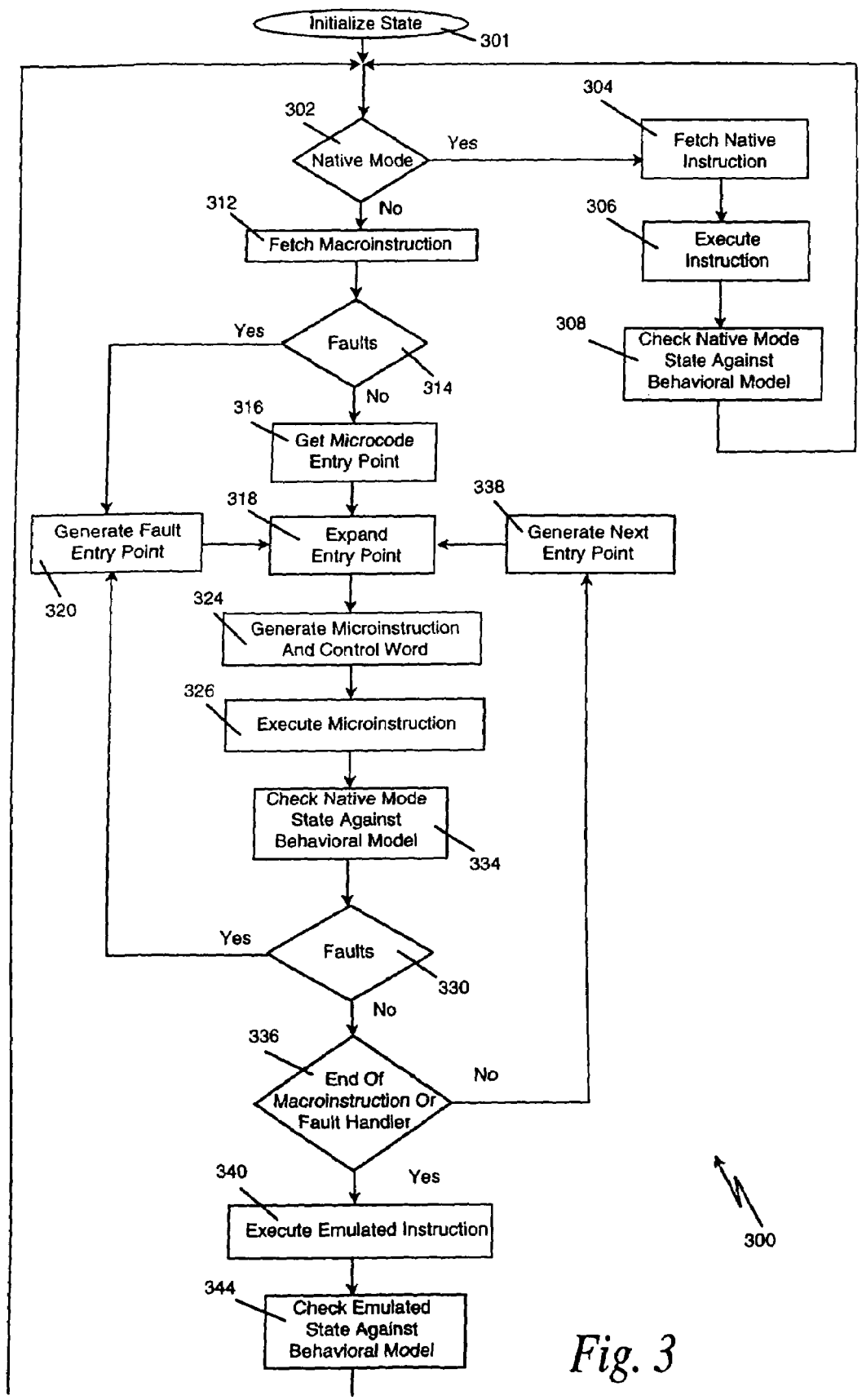
FIG. 3 is a flow diagram illustrating an embodiment of a process carried out by the components shown in FIG. 2.

Operation of the system will now be explained with reference to the flow chart 300 shown in FIG. 3. Processing begins by initializing the native mode reference simulator 216 and the emulated mode reference simulator 218, block 301, and transitions to block 302, where the instruction set mode is checked. If the code is in the native mode, the mechanism 200 transitions to a fetch native instruction block 304, and the native mode instruction is fetched (read) from memory. In execute instruction block 306, the mechanism 200 executes the native instruction and moves to check state block 308. In block 308, the mechanism 200, using the state checker 214, checks the native mode state against the CPU behavioral model 212 and returns to step 302.

In step 302, if the instruction is not a native mode instruction, the macroinstruction bytes are fetched from memory, block 312. Next, the macroinstruction fetch (memory read) related faults are detected, block 314. If the test shows no faults, the microcode entry point for the macroinstructions is determined, block 316. The emulated instruction sequencer 220 decodes the instruction and generates an entry point into the microcode storage device 224. The entry point is the location in the microcode storage device 224 that marks a beginning of a sequence of microinstructions that make up a given macroinstruction.

In expand entry point block 318, the entry point and the macroinstruction bytes are passed to the microcode expander 222. The microcode expander 222 reads the microcode storage device 224, fills in the microinstruction's alias fields, such as operand or address size, based on the macroinstruction, and generates a control word and one or more microinstructions, block 324.

In block 314, if the test for faults in the microcode indicate the presence of one or more faults, a fault entry point into the microcode is determined, block 320. The mechanism 200 continues to the expand entry point block 318, and processing continues as before.

In block 326, the native mode microinstruction is executed on the native mode simulator 216. The native mode state is then checked against the behavioral model, block 334, using the state checker 214. Any fault or control changes are reported back to the emulated instruction sequencer 220. If any faults were generated, block 330, processing returns to block 320 to generate a fault entry point into the microcode. If no faults were generated, processing moves to block 336.

If the executed native mode microinstruction is not the last microinstruction in a macroinstruction, block 336, the process moves to generate next entry point block 338, and a next microcode entry point into the microcode storage device 224 is generated. If the microinstruction just executed represents a last microinstruction (i.e., the last microinstruction that comprises the emulated macroinstruction), as indicated by an end of macroinstruction marker in the microcode storage device 224, the mechanism 200 moves to block 340 where the emulated instruction is executed on the native mode reference simulator 216. The state of the CPU behavioral model 212 is then compared with the reference emulated instruction set model 218, using the state checker 214, and any differences are reported, block 344. The process 300 then repeats, starting at block 302.

Simulating microinstructions and checking the CPU behavioral model 212 at the microinstruction boundaries has two main advantages. The method allows finer-grained checking of the CPU behavioral model 212. By independently generating and executing the same sequence of microinstructions as the CPU behavioral model 212, the reference model can check an architectural state after each microinstruction rather than waiting until the end of the emulated macroinstruction to check the architectural state. Some macroinstruction flows can be very long, e.g., several hundred microinstructions. This allows faster and more accurate identification of deviations between the CPU behavioral model 212 and the reference model. The method also allows identification of differences that are not made architecturally visible on the macroinstruction level, such as aliasing problems.

For example, the macroinstruction:
 add mem16, reg
performs the operation:
 Dest<–Dest+Src If Dest (destination) is a memory location specified by a base and an offset, and Src is a register, then the macroinstruction may be broken down into the following sequence of microinstructions:

```
add mem16, reg
    r1 = generate_address (base, offset)
    r2 = mem2[r1]              # read 2 bytes from memory
                                 from the address in r1
    r2 = r2 + reg
    mem2[r1] = r2              # store 2 bytes to memory in
                                 the address in r1
```

By independently generating the sequence of microinstructions in the emulated instruction sequencer 220, the mechanism 200 is able to check that the CPU behavioral model 212 executes the correct sequence of microinstructions, and is able to check the individual result of each microinstruction. For example, if the CPU behavioral model's control logic incorrectly generated a load size of four bytes instead of two bytes, the error would be signaled immediately. Were the CPU behavioral model only to be checked at macroinstruction boundaries, the error may not be detected. Similarly, if the load returned wrong data in the CPU behavioral model, such an error would be detected following execution of the load microinstruction, but at the macroinstruction level, it would be difficult to determine which microinstruction caused the error.

The method also allows microcode development including both instruction execution and fault behavior in the absence of a behavioral model, which is not available with current methods. By including macroinstruction execution, the emulated instruction set reference model 218 is able to verify the correctness of the microinstruction sequence. In addition, generating and executing the microcode on the reference model is significantly faster than doing so on a behavioral model. This allows for faster microcode development, or development in an environment where the behavioral model is incomplete or not functionally correct.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. An apparatus for verifying correctness of a behavioral model of a microcode machine, the microcode machine operable in a native state and an emulated state, the apparatus, comprising:
 means for producing the native state;
 means for producing the emulated state;
 means for comparing the native state and the emulated state;
 means for determining a microcode entry point into a microcode storage device that stores microcode; and
 means for generating microinstructions corresponding to the microcode, wherein a sequence of microinstructions corresponds to a macroinstruction, wherein the means for producing the native state includes means for executing the microinstructions, wherein the means for producing the emulated state includes means for executing the macroinstruction; and wherein the behavioral model comprises one of a hardware description language and a processor.

2. A method for verifying the correctness of a processor behavioral model, wherein a processor operates in one of a native mode state and an emulated mode state, the method, comprising:

determining if a macroinstruction to be executed is a native instruction;

if the macroinstruction is a native instruction, executing the native instruction, the execution producing the native mode state of the processor;

if the macroinstruction is not a native instruction;
fetching the macroinstruction,
providing microinstructions corresponding to the macroinstruction, and
executing the microinstructions, the execution producing the native mode state of the processor;

executing the macroinstruction, the execution producing an emulated state of the processor; and comparing the native mode state of the processor with the emulated state of the processor.

3. The method of claim 2, further comprising checking the native mode state of the processor against the behavioral model.

4. The method of claim 3, wherein checking the native mode state of the processor against the behavioral model comprises checking for faults generated during execution of the native instruction.

5. The method of claim 2, wherein providing microinstructions comprises:

generating a microcode entry point, the microcode entry point indicating a location in a microcode storage where the microinstructions begin; and expanding the microcode entry point.

6. The method of claim 5, wherein expanding the microcode entry point comprises:

reading the microcode storage;
generating alias fields for the microinstructions;
generating a control word; and
generating the microinstructions.

7. The method of claim 6, wherein generating the microinstructions comprising determining one or more of faults, traps, and exceptions.

8. The method of claim 2, further comprising:
testing the fetched macroinstruction for faults; and
if a fault is detected, generating a fault entry point into a microcode storage that stores microcode for use by the processor.

9. The method of claim 2, wherein executing the macroinstruction comprises executing the macroinstruction on an emulated mode reference simulator that verifies the microinstructions correctly emulate the macroinstruction.

10. A method for verifying the correctness of a behavioral model of a micro-coded machine, comprising:

executing a sequence of microinstructions on a native mode simulator, the execution producing a native mode state of the micro-coded machine, wherein the sequence of microinstructions corresponds to a macroinstruction;

executing the macroinstruction on an emulated mode reference simulator, the execution producing an emulated state of the micro-coded machine; and checking the native mode state and the emulated state against the behavioral model.

11. The method of claim 10, further comprising:
determining the sequence of microinstructions, comprising:

reading the macroinstruction, and
determining an entry point into a microcode storage, the microcode storage storing microinstructions for execution by the micro-coded machine, wherein the entry point defines a first microinstruction in the microinstruction sequence; and a expanding the microcode entry point.

12. The method of claim 11, wherein expanding the microcode entry point comprises:
reading the microcode storage;
generating alias fields for microinstructions in the sequence of microinstructions;
generating a control word; and
generating the microinstructions.

13. The method of claim 12, wherein generating the microinstructions comprises determining one or more of faults, traps, and exceptions.

14. The method of claim 10, further comprising:
testing the macroinstruction for faults; and
if a fault is detected, generating a fault entry point into the microcode storage.

15. An apparatus that verifies the correctness of a processor behavioral model, comprising;

a microcode storage that stares microcode corresponding to microinstructions;

a microcode expander tat reads the microcode storage;

a native mode reference simulator that executes microinstructions, wherein execution of the microinstructions produces a native mode state of a processor;

an emulated mode reference simulator that executes macroinstructions, wherein a macroinstruction comprises a sequence of microinstructions, and wherein execution of the macroinstruction produces an emulated mode state of the processor; and a state checker that compares the native mode state and the emulated mode state to the behavior model.

16. The apparatus of claim 15, further comprising an emulated instruction sequencer, wherein the native mode reference simulator reports faults and state or control changes to the emulated instruction sequencer, and wherein the emulated instruction sequencer determines a subsequent microinstruction for execution based on one or more of the faults and the state or control changes.

17. The apparatus of claim 15, wherein the processor behavioral model is written in hardware description language.

18. The apparatus of claim 15, wherein the emulated mode reference simulator is independent of the processor behavioral model.

* * * * *